A. W. KNUTSON.
AUTOMATIC ENGINE STARTER.
APPLICATION FILED DEC. 30, 1910.
1,145,690.
Patented July 6, 1915.
3 SHEETS—SHEET 1.
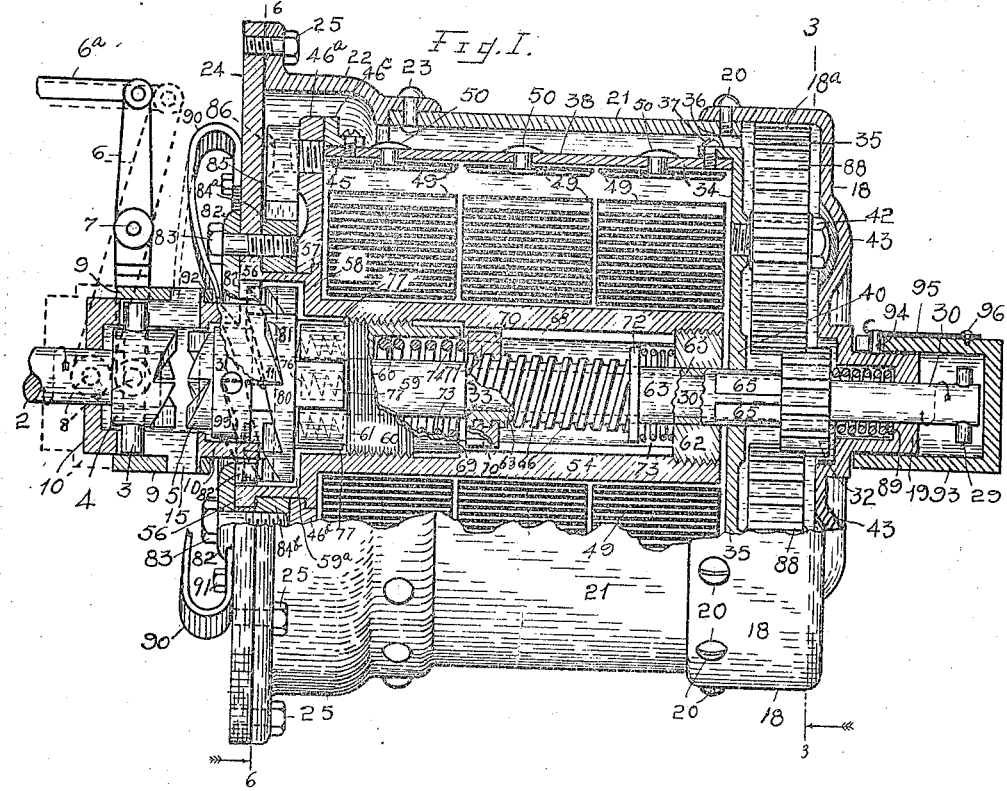
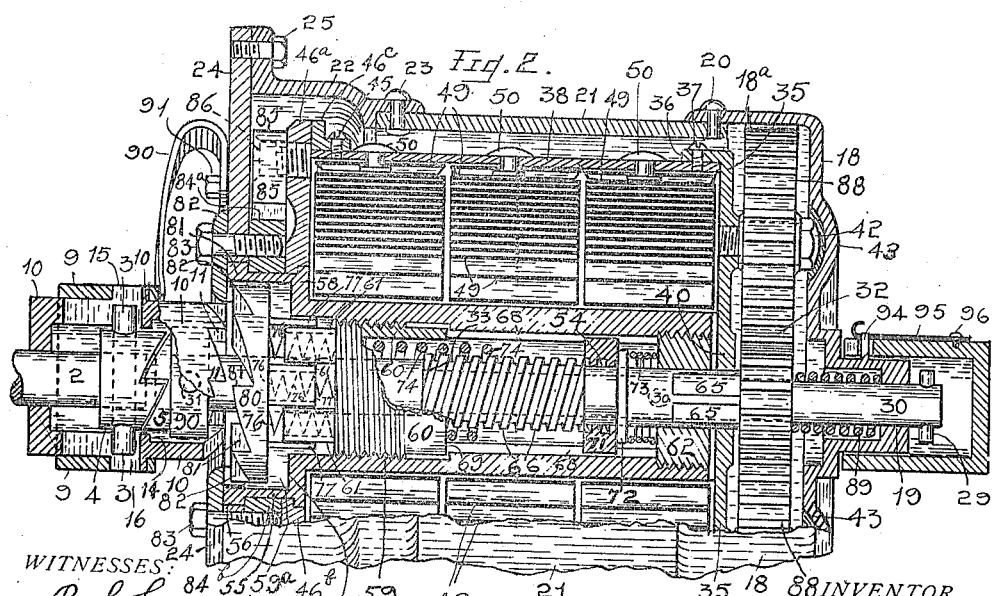
WITNESSES:
B. S. Lyon
C. S. Richards
INVENTOR.
A. W. Knutson
BY
W. M. Richards
ATTORNEY.

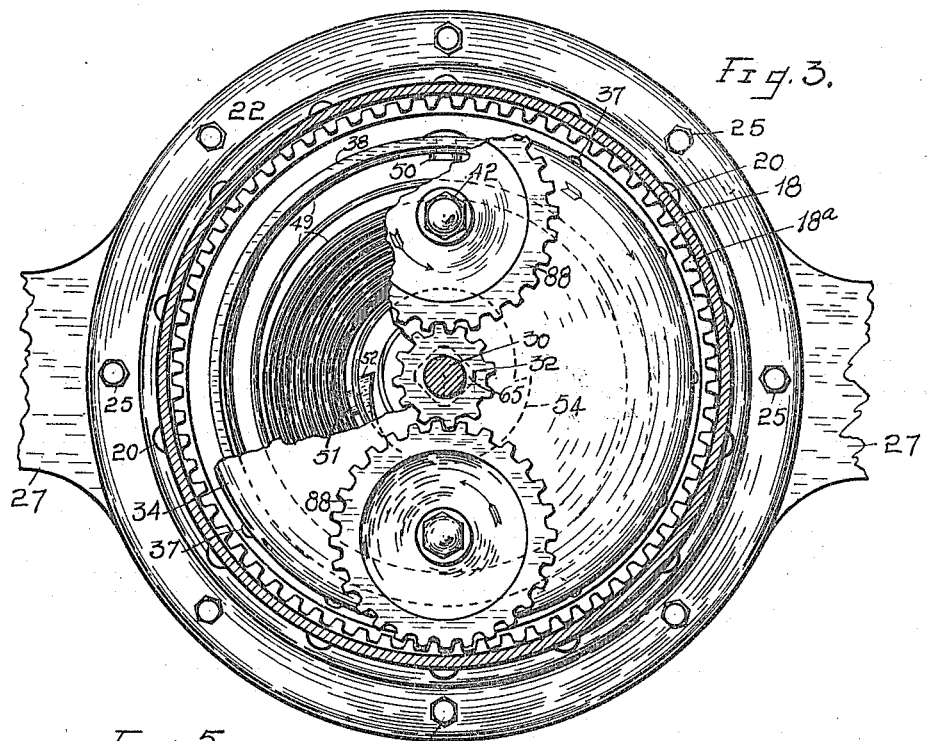
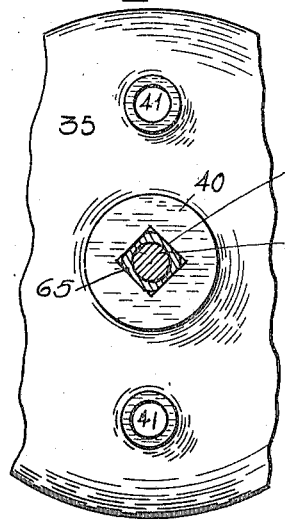
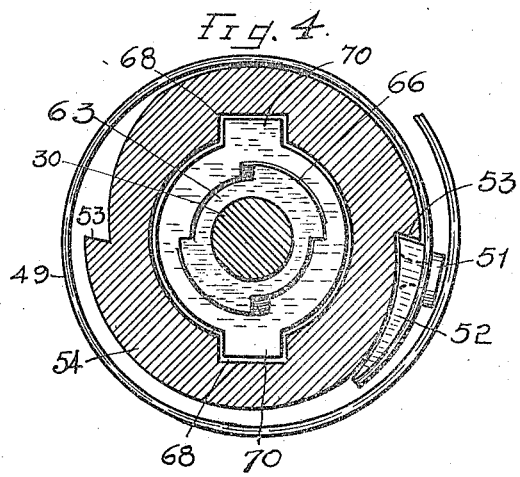

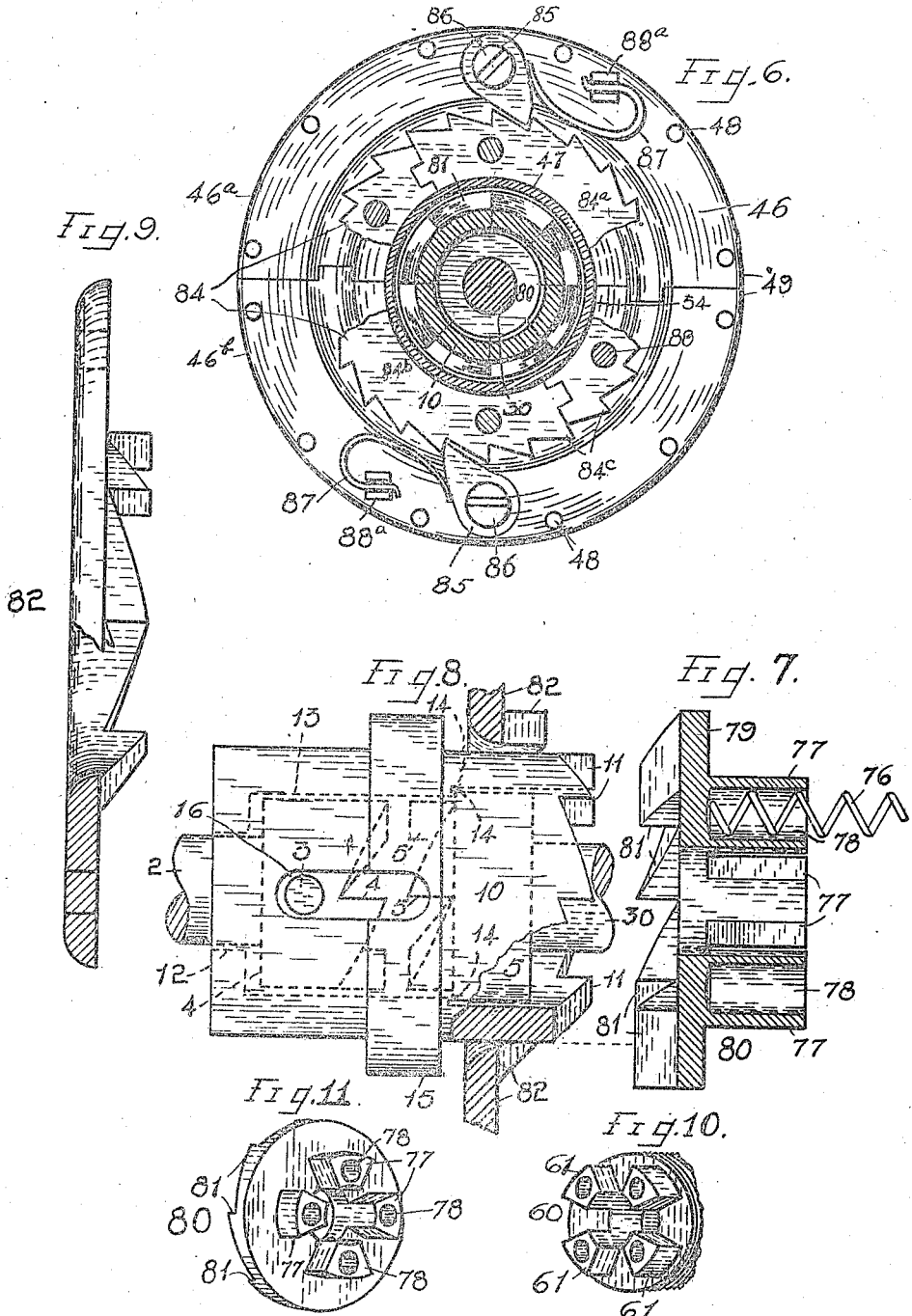

UNITED STATES PATENT OFFICE.

ALFRED WM. KNUTSON, OF GALESBURG, ILLINOIS, ASSIGNOR, BY DIRECT AND MESNE ASSIGNMENTS, TO AUTOMATIC DEVICES COMPANY, OF GALESBURG, ILLINOIS, A CORPORATION OF ILLINOIS.

AUTOMATIC ENGINE-STARTER.

1,145,690.  Specification of Letters Patent.  Patented July 6, 1915.

Application filed December 30, 1910. Serial No. 600,094.

*To all whom it may concern:*

Be it known that I, ALFRED W. KNUTSON, a citizen of the United States, and a resident of Galesburg, in the county of Knox and State of Illinois, have invented a new and useful Automatic Engine-Starter, of which the following is a specification.

My present invention relates to engines not self-starting, and while I have designed and adapted it for automobile engines its applicability to various other engines of the explosion type will at once be apparent.

The fundamental object of the invention is to provide means whereby the operator, without leaving his accustomed and ordinary position, by tripping a conveniently disposed lever or other means, will by that act alone set into motion a mechanical motor which will actuate means which will in turn impart rotary or cranking movement to the main shaft of the engine.

It is a further object to provide means which, co-acting automatically with the means above referred to, will, as soon as the engine has started and is in action, and the operator has released the tripping means, be energized or wound thereby, to a predetermined point, whereby the proper energy is stored in the motor to again start the engine when it becomes necessary. Instantly upon a sufficient amount of energy being thus stored, it is desirable, (in order that there be no wear on the parts and that there be no friction thereof and no noise occasioned thereby,) that the parts constituting my improvements be still or stationary; and to provide means which will be utterly free from engagement with the engine, and therefore at rest, constitutes a special object.

To so construct and combine the means for performing the foregoing recited objects that all danger of breakage by reason of too great movement or abnormal unwinding of the spring, is eliminated, constitutes still another of the leading objects.

To so construct and combine the parts of my improvement that they will, instantly upon being wound to the predetermined amount or degree, by the engine-shaft, free themselves from engagement with said engine, and automatically lock themselves against movement until they are again given an initial impulse by the operator, constitutes an important object.

To rewind the motor with a minimum of energy, and to reduce to a minimum the shock which the engine, when on "high speed", would impose upon the winding mechanism is a still further object.

All automobiles are provided with devices that advance the electric spark for igniting the combustion mixture so that it explodes before the motor piston reaches the dead-center. Should this device be left in working position, the motor will "kick back" and start to run backward. It is a special object of my invention to provide means which will overcome this.

In the event of the operator forgetting to take his foot or hand from the tripping means, and in the absence of anything to prevent, the starting mechanism would be broken and disabled. It is an object to provide means whereby such accidents are with certainty avoided.

To provide novel means for manually cranking the engine constitutes another object.

To so incase the parts of my improvements that they will be shielded from the elements forms another object. In this connection it may be here stated that the same means provides an effective shield against the escape of oil.

To dispense with the use of a brake constitutes an object.

It is an object to dispense with centrifugally acting means of any nature whatever.

That the mechanism constituting the means for performing the above recited objects be durable, strong and simple, and the elements thereof positive in their action and co-action, is a prime requisite; to provide such means for carrying out these ends constitutes still another object.

Minor objects will be in part obvious and in part pointed out.

In the accompanying drawings all my improvements are embodied in the best way now known to me; obviously, however, some of these constructions may vary in form, disposition and assemblage from that shown, and some may be used without the others. I therefore desire to be understood as claiming all such advantages as are enforced by or arise out of any similar devices or constructions, or which may accrue from modifications or from combinations thereof.

In said drawings: Figure 1 is a vertical central longitudinal section, partly in elevation, showing my improvements embodied in the best way now known to me and illustrating the means for connecting them to the main shaft of the engine, and further showing a simple rocker and connecting or tripping rod. In this full-line position shown in this figure the parts are shown as if the movement to effect disengagement of the means which hold the power-storing device had just been made, and the spring just beginning to expand to "crank" the engine. Fig. 2 is a vertical central, longitudinal sectional view, partly broken away, the parts in different relative positions from those shown at Fig. 1; Fig. 3, a transverse sectional view, taken in the line 3—3 in Fig. 1, but the pinion shown in elevation; Fig. 4, an enlarged detail, partly in section, taken at the left hand or inner edge of the nut, and seen as if looking toward the outer end of the device; Fig. 5, a detail partly in section and partly in elevation, taken at the outer edge of the boss on the head of the spring-case or barrel, and seen as if looking toward the inner end of the device; Fig. 6, an end elevation, partly in section, taken in the line 6—6 in Fig. 1; Fig. 7, an enlarged longitudinal, vertical, central sectional detail of the arbor actuated ratcheted clutch member; Fig. 8, an enlarged detail of the cranking sleeve. Fig. 9, an enlarged detail, an edge elevation, partly broken away and partly in section, of the arbor-locking annulus or clutch-member; Fig. 10, a fragmental detail, a projection of the fingered clutch-member (or clutch-box) which constitutes a portion of the arbor; and Fig. 11, a projection, a detail of the fingered clutch-member which is adapted for engagement with the one shown at Fig. 10.

Coming now to a description of the drawings, the same numeral indicating the same part in the different figures thereof, 2 denotes the main shaft of the engine, and is provided near its extremity with a radial aperture which receives a wrist pin 3 which performs several functions, one of which is to hold in engagement with the shaft 2 one member, 4, of a ratcheted spring-winding clutch, the other member, 5, of which will be presently described.

A rocker 6, suitably fulcrumed at 7, is engaged with trunnions 8, on a collar 9 which is loosely mounted on an arbor-actuated cranking-sleeve 10 which is apertured at its rear end to receive the shaft 2, its other end being provided with an annular series of ratchet teeth 11.

6ᵃ is a rod, leading to the automobile body, and is pivotally engaged with the rocker 6.

The sleeve 10 constitutes one member of a clutch, and is provided with an axial bore 12 and a relatively larger similar bore 13, providing a shoulder 14, see Fig. 8. Also, the sleeve 10 carries an integral annular boss 15. Diametrically opposite slots 16 are formed in the walls of the sleeve 10 and receive the ends of the wrist 3.

18 represents a cap provided with an axial bearing 19 and with apertures in its flanged portion 18ᵇ for the reception of bolts or rivets 20 by which it is secured on the cylinder 21. This flanged portion is provided with internal gear teeth 18ᵃ extending in an annular series. A flanged member 22 is similarly secured to the cylinder at 23, its flange being secured to the annular base 24 by machine screws 25. A projection 27 extends from each side of the base 24 to provide means whereby the device may be secured on the automobile or other object.

The outer portion of the drive or motor shaft 30 is seated in the bearing 19 in the cap and at its outer end is apertured for the reception of a cranking-pin 29. Intermediate its ends the shaft is enlarged to provide a shoulder 33, and at its inner end the shaft carries the ratcheted clutch member 5 hereinbefore referred to, a pin 31 uniting them, and restraining them from movement with relation to each other. A pinion 32 is keyed on the shaft 30 near its outer end.

34 indicates the spring-barrel, and comprises a disk-like head 35 which is provided with an integral annular flange 36 fixed by screws or rivets 37 to a cylinder 38. The head 35 is provided with a square central opening 39 (see Fig. 5) afforded by an annular bearing-boss 40, and with diametrically opposite openings 41 which receive the ends of screws 42, the heads of which traverse the annular way 43 in the cap 18. The stems of the screws 42 provide journals for spur or planet-wheels 88 which mesh with the internal gear teeth 18ᵃ and with the pinion 32. An L-shaped ring 46ᶜ is fixed to the cylinder 38 at its inner end by screws 45.

The inner end of the barrel is closed by a head 46 which has a central aperture 47 which constitutes a bearing for the inner end of the spring case or barrel. For convenience' sake the head 46 is made in two like interlocking parts 46ᵃ, 46ᵇ, as shown at Fig. 6. This head is fixed by screws (not shown) passed through a series of apertures 48 near its outer edge, to the flange of the ring 46.

The mainsprings or motor springs 49 are preferably three in number to not only provide ample power for large engines, but also in order that should one break, or be rendered useless, as by an accident, two, which will be ordinarily sufficient as against the resistance of the most powerful engines, will remain. The outer end of each spring is fixed by a rivet 50 to the cylinder 38, and their inner ends each fixed by a rivet 51 to a slip-clip 52 which is adapted for engagement with either one of a pair of ratchet teeth 53 arranged longitudinally of an arbor 54. This arbor comprises an annulus 55 which at its inner end is provided with a flange 56, its outer end, at its upper portion, being shouldered to provide a stop 57. The annulus is formed at its inner end with an inwardly turned wall 58 to form a chamber $59^a$ for a larger clutch-member yet to be described. The main portion of the arbor is internally threaded, for a short distance, at 59, to engage an externally threaded tubular clutch-box 60 which has at its inner end a plurality (shown as four) of clutch-fingers 61. The clutch-box 60 is immovable with relation to the arbor. At its other end the arbor is similarly threaded and receives a threaded head 62 which is centrally bored for the reception of a sleeve 63 which is squared at 65, and at 66 is provided with threads or spirals, which threads are their own height greater in diameter than said sleeve. As shown best at Fig. 1, the sleeve 63 is rotatably mounted on the shaft 30, and its angular portion is adapted for longitudinal reciprocating movements in the head 35, whereby it rotates with said barrel. The arbor is centrally bored throughout its length, and is provided with confronting grooves 68 (Fig. 4) which extend from the head 62 to an annular shoulder 69 which is provided by the forward end of the clutch-box 60. In these are disposed the oppositely projected feathers 70 of a nut or dog 71 which is internally threaded to receive the threads 66. A washer 72 having a central opening just sufficient to permit it to slide on the sleeve 63 it fitted thereover with one of its faces resting normally where shown at Fig. 1. A compression spring 73 embraces the sleeve 63 between the head 62 and the said washer. A compression spring 74 embraces the portion 59 of the shaft 30 and is disposed within the chamber of the clutch-box 60 and is restrained from movement in one direction by the inner wall thereof. Said wall is centrally apertured to provide a bearing at that point for the enlarged portion of the drive-shaft. The fingers 61 are spaced from each other and each finger is chambered for the reception of a compression spring 76, the other portion of which springs rest within the chambers 78 of fingers 77 which project from one face of the base wall 79 of a Janus-faced clutch member 80 (Fig. 7,) the other face of which constitutes a ratcheted rack 81, the teeth of which are much greater in their cross sections than are the teeth of the clutch face of the sleeve 10, which is one of two elements with which it co-acts at different times. A ratchet-faced arbor-locking annulus 82 is secured on the casing-base 24 by means of bolts 83 projected through said parts. the terminals of said bolts engaging threaded apertures in a ratchet plate 84 (Fig. 6), which is, for the purpose of ready assemblage, made in two parts $84^a$, $84^b$. Locking dogs 85 are pivoted to the face of the base 45 by screw-bolts 86, and are held in engagement with the teeth $84^c$, of the wheel 84 by means of bent springs 87, the fixed ends of which are secured in the slots of set-screws $88^a$ threaded into said base $46^a$. Planet wheels 88 are journaled on the stems of the screws 42, and mesh with the sun-pinion 32 and with the internal gear teeth $18^a$. A compression spring 89 embraces the forward portion of the shaft 30, seating within the chamber of the extension of the cap, and its inner end bears against the forward face of the sun-pinion. Retractile springs 90 are fixed to the casing-head 24 by screws 91, their free ends being in contact with the friction-ring 92 which encircles the sleeve 10 forwardly of the collar 15. A protecting cap 93 fits snugly over the extension 19, which is provided with a recess which receives the point of a pin 94 projecting through a pin hole in the barrel of said cap 93 and carried by a pressure-spring 95 fixed to said cap by a screw 96.

The operation: Assume the parts to be in the relative position shown by dotted lines at Fig. 1. By tripping means within (for instance) the automobile body, which means may be a pedal, push-bar, pull-rod or any other suitable means connected with the connecting-rod $6^a$, the operator will throw the rocker to the position shown by full lines at same figure, whereupon the parts of the cranking mechanism will assume the relative positions there shown, in which position they are just starting to crank the engine. This movement, i. e., to assume the positions shown in full line, is accomplished as follows: The end of the rocker will act on the pin 8 to thrust the sleeve 10 forwardly against compression of the springs 76 and 90 until it pushes the ratchet-teeth 81 out of engagement with the teeth 11, whereupon the springs 49 will begin to expand. The slip-clips will bear against one of the arbor-ratchets 53 and as the springs 49 continue to expand they will thus cause the arbor to rotate in the direction of the arrow, Fig. 1, on the engine shaft 2, or clockwise. The clutch-box being fixed (by the threads) on the arbor, will impart like motion to its fingers 61 which in turn transmit the same motion to the fingers 77, to impart it to the clutch-teeth 81, the inner portions of which will engage the teeth 11, which, being a part of the sleeve 10, will by means of the pin 3 rotate the engine shaft.

During this operation, the feathers 70 holding the nut or dog 71 to revolve with the arbor, (said feathers being seated in the grooves 68,) and the threaded sleeve 63 being held stationary by reason of the squared portion 65 thereof being seated in the similarly shaped opening 39 in the boss 40 of the head 35, the nut will traverse the threads 66 of said sleeve toward its outer end, or to unthread it. As soon as the nut begins to move away from the shoulder 69, the spring 89 exerts force against the sun-wheel and thereby on the shaft 30 to tend to throw the clutch member 5 into engagement with the teeth of the clutch member 4. Unless some means were interposed, this movement would throw the parts into rewinding position. To prevent this, the shoulder 14 in the sleeve 10 has been provided. As long as the operator holds the parts in the full line position shown in Fig. 1 this cannot occur, because said shoulder will interpose to be contacted by an annular flange 99 which forms a part of the clutch member 5. Assume the engine to have been started by the operation just described: The operator will release the manually actuated means in the automobile, and all the parts up to and including the sleeve 10 will by the action of the springs 90 be thrown back to the positions shown by dotted lines in same figure and by full lines in Fig. 2, whereupon the spring 89 will exert the force which it was lately herein stated to tend to exert, and thereby thrust the shaft 30 and all parts thereon to move inwardly to cause the clutch member 5 to engage its companion 4, and as soon as this engagement is effected the energy of the engine will exert a winding force upon the shaft 30 and thereby upon the sun-pinion, which transmits motion in the contrary direction to the planet-wheels 88 which engage the teeth 18ª in the stationary cap 18, whereby the spring-barrel 34 is caused to rotate in the direction indicated by the arrow on the head 35. This movement will cause the spring 49 to be rewound in an evident manner, inasmuch as the rivets 50 will carry the fixed end of the spring around the arbor, which is held stationary by reason of the teeth 81 being in contact with the teeth 82. The head 35 will cause the hollow shaft to revolve in the same direction as does the barrel 34; the pawls or dogs 85 will each engage a tooth of the ratchet plate 84 (which is always, because of its being fixed to the base 24, stationary,) and thus hold the barrel from backward rotation. It will be here noted that in winding the springs 49 the arbor is stationary, and the barrel rotates, clockwise, when seen from the front or projecting end; and while the spring is in the act of cranking the engine shaft, the barrel is held stationary by the dogs 85, and the arbor rotates in the direction just recited. It is to be noted also that the teeth of the pair 80—10 are inclined in a direction reverse to the inclination of the teeth of the pair 4—5. Therefore, although the movement of both these pairs is clockwise, their functions are the reverse of each other—that is to say, while turning clockwise the first recited pair will "crank" the engine; and while turning in the same direction the other pair will store the energy in the springs 49. In the event of the operator neglecting or forgetting to take his foot or hand off the starting lever or other means, or if a part should accidentally catch, or "stick", abnormal unwinding of the motor springs will result. In order that this may not result in injury to any of the parts, I provide means for preventing such, said means comprising the nut, on which the threads thereof operate, (which threads terminate on a plane surface,) and the slip-clips, the operation of these being as follows: An abnormal rotation of the arbor after the springs 49 are fully unwound will cause the slip-clips to ratchet over the ratchet-teeth on the arbor, and the nut will slip past the ends of the spirals 66 and onto the plane face of the shaft. As shown at Fig. 2, the washer 72 and spring 73 will hold said nut in contact with the initial thread 66, ready for engagement upon the movement of the sleeve. When the sleeve is rotating clockwise, the nut travels inwardly, (the threads on the shaft shown as left-hand threads,) and when said sleeve is stationary, as in the other operation, the nut will travel outwardly, or toward the washer, which movement is caused by the rotation of the arbor, within which it is fixed (rotatively) by the feather 70. The complete number of turns necessary to wind the springs 49 is controlled by the number of turns of the spirals 66. If it require but one complete turn of the springs to start the engine, the nut will traverse but one complete turn of the spirals 66; upon reversing, the nut will return the same distance, or to the same fixed and predetermined point. A like effect would be had if two, three, or even all the spirals 66 were traversed, the nut always returning to its initial or normal position. The square opening 39 in the boss 40, will, as the spring-case or barrel 34 revolves, act on the squared portion 65 of the hollow shaft 63, and the nut 71 will follow the spirals on said shaft toward the spring 74 and shoulders 69. It will first contact the spring, but owing to the great frictional contact between the clutch members 4 and 5 the spring will be compressed until the fins on said nut come in contact with the shoulder 69. At this point further energy from the engine will cause the nut to screw the hollow shaft against the sun-pinion 25 and thereby all members on said shaft away from the clutch member 4, and as soon as the teeth of members 4 and 5 clear or are free from contact, there is no more resistance offered to the spring 74, whereby it will further thrust said shaft in the direction described, to provide ample clearance between the teeth of members 4 and 5. The spring 74 being somewhat stronger than the spring 89, one exerts its energy against the other, but the former overcomes the force exerted by the latter. When energy is required from spring 89 the nut 71 is out of contact with the stronger spring. and no resistance is offered thereby to the weaker one.

It will be seen that in rewinding the motor springs the shaft makes many more rotations than does the arbor in unwinding said springs. This I accomplish by the planet gear in order to rewind with less energy and further in order to reduce to a minimum the shock which the engine would cause to the rewinding mechanism if started on high speed. The force exerted by the plurality of springs will be sufficient to overcome any tendency of the engine to "kick back", inasmuch as the slip-clip is positive in its engagement with and action on the arbor-teeth.

It will be evident that when the engine is running, all the parts carried by or within the casing are idle; that there is no friction thereon or thereby, and that they create no noise, inasmuch as the sleeve 10 rotates with relation to said casing and its teeth are free and clear from the teeth of its companion, 80.

The sun-wheel is always in gear with the planet-wheels, but it is adapted to have longitudinal movements with the shaft 30. Should the full unwinding of the springs fail to start the engine, the operator will after removing the protective cap 93 in an evident manner, apply a hand crank to the pin 29 and shaft 30 to manually rewind the springs 49. Then by applying them to the engine in the manner described, said engine will, as soon as it starts, rewind the starting mechanism and the latter will automatically disengage itself from the engine without any effort whatever, either mental or physical, on the part of the operator.

It has not been thought necessary to encumber this specification and the accompanying drawings with descriptions and illustrations of modifications which are neither essential to nor form any part of the invention. In fact, it is apparent without such that numerous changes may be made in the details of construction and in the arrangement of the parts thereof, by modifications involving merely mechanical skill, without departing from the spirit and scope of the invention, viewed in its broadest aspect. All this will be indicated in the claims hereof, wherein the omission of an element or the non-inclusion of reference to the detail features of the elements recited is intended to be a formal declaration of the fact that the omitted elements or features are not essential to the invention covered by that claim.

Therefore, without limiting myself to particularities I claim as new the following, namely:

1. In an engine-starter, spirally threaded means adapted to rotate, means for holding it from rotation, means for rotating it, traveling means adapted to receive endwise movement in one direction from said threaded means, means for rotating said threaded means, means for rotating said traveling means with relation to said threaded means and thereby imparting endwise movement to said traveling means, the direction of rotation of both the traveling means and the spirally threaded means being the same, and means for imparting longitudinal movement to said spirally threaded means.

2. In combination in an engine-starter, a spiral-faced hollow shaft having a plane surface at one end portion, means for actuating it, a nut threaded on the threaded portion of said shaft, a shaft within said hollow shaft, said nut adapted to impart longitudinal movement in one direction to said contained shaft, means for actuating the contained shaft in the opposite direction, means for rotating said nut while said hollow shaft is held from rotary movement, whereby the nut travels in one direction, and means for rotating said hollow shaft while said nut is held from rotary movement, whereby the nut travels in the opposite direction.

3. In combination in an engine-starter, a spiral-faced hollow shaft, a nut threaded thereon, means for rotating said shaft while the nut is held from rotation, whereby the nut is caused to travel longitudinally in one direction on said shaft, means for rotating said nut while said shaft is held from rotation, whereby the nut is caused to traverse said shaft in the contrary longitudinal direction, and means for imparting longitudinal movements to said hollow shaft.

4. In combination in an engine-starter, a spiral-faced hollow shaft, a nut threaded thereon, means for rotating said shaft in one direction while the nut is held from rotation, whereby said nut is caused to travel in one longitudinal direction on said shaft, means for rotating said nut in the same direction as that of the shaft while the latter is held from rotation, whereby the nut is caused to traverse said shaft in the contrary longitudinal direction to that first described, and means for imparting longitudinal movements to said hollow shaft.

5. In combination in an engine-starter, spiral-faced clutch-actuating means, reciprocatory means mounted thereon, means for rotating said spiral-faced means in one direction while the reciprocatory means is held from rotation, whereby said reciprocatory means is caused to travel in one longitudinal direction with relation to said spiral faced means, means for rotating said reciprocatory means in the same direction as that of the spiral faced means while the latter is held from rotation, whereby the reciprocatory means is caused to travel in a longitudinal direction contrary to that first recited, and means for imparting longitudinal movements to said spiral-faced means.

6. In combination in an engine-starter, a hollow shaft provided with a thread terminating in a plane surface, a nut threaded on the threaded portion recited and adapted to pass onto said plane surface, means for causing it to reëngage said threads, said nut adapted to impart motion to said shaft in one direction and said shaft adapted to impart motion to said nut in the contrary direction, means for rotating the hollow-shaft in one direction while the nut is held from rotation, and means for imparting rotary movement in the same direction to said nut while the hollow shaft is held from rotation.

7. In an engine-starter, an engine-shaft, a starter-shaft rotatable thereby, a spring-barrel actuable by the starter-shaft, a power-storing spring wound thereby, an arbor rotatable in one direction by said spring, a hollow rotatable and slidable shaft on said starter-shaft and adapted to receive rotary movement from said barrel, a nut threaded on said hollow shaft and rotatable by said arbor to cause the nut to traverse said shaft in one direction, means for locking said arbor while said hollow shaft is rotating, whereby said nut is caused to traverse said shaft in a direction contrary to that last described, and means contactable by said nut for effecting engagement and disengagement of said engine-shaft and starter-shaft.

8. In an engine-starter, power-storing means, rotary means with which one end of said means is constantly engaged, and rotatable ratcheted means adapted to be rotated while said first recited means is rotating, and the other at rest, and said power-storing means adapted to ratchet on the ratcheted means and the second recited means at rest.

9. In an engine-starter, a power-storing spring, a rotatory barrel to which one end of said spring is fixed, and an arbor provided with a peripheral ratchet adapted to be engaged by the other end of said spring to rotate said arbor, and the last recited end to slip over said ratchet when the arbor is rotating and the barrel at rest.

10. In an engine-starter, a spring-barrel, a power-storing spring, one of its ends fixed thereto, means including a shaft actuated by the engine shaft for rotating said barrel, a hollow shaft mounted on the shaft first recited, said hollow shaft including a peripheral thread terminating on a plane surface, a nut adapted to traverse said thread and plane surface, said nut adapted to be actuated in one direction by said thread, an arbor including a clutch-box for revolving said nut to actuate it in the contrary direction of said thread, said arbor rotatable by said spring, means for reëngaging said nut with said thread after it has passed onto the plane surface, said clutch-box limiting the movement of the nut in one direction, a Janus-faced clutch-member, one of its faces in engagement with said clutch-box, a sleeve rotatable by the other of its faces, and means for locking said Janus-faced member from rotation, said Janus faced member adapted to be forced out of engagement with said locking means by said sleeve, and said sleeve manually actuable in one longitudinal direction.

11. In an engine starter, a casing including a base, a head, and an internal gear wheel, planet-wheels in mesh with said wheel, a sun-wheel in mesh with said planet-wheels, a motor shaft on which said sun-wheel is mounted, a hollow shaft on said motor shaft, said hollow shaft including a peripheral thread and a plane surface on which the thread terminates, resilient means adapted to impart endwise movement to said motor shaft, a spring-barrel rotatable by said planet-wheels and adapted to rotate said shaft, a power-storing spring, one of its ends fixed to said barrel, a ratchet-peripheried arbor including a clutch-box fixedly secured interiorly of said arbor and providing a shoulder therein, a head in said arbor, a spring embracing said hollow shaft and disposed between said nut and threads, said arbor and nut so constructed and combined that the nut will revolve with the arbor and is adapted for reciprocatory movements therein, said nut adapted to contact said clutch-box shoulder in one of its endwise movements, a ratchet-plate fixed on the head of said casing, a spring-actuated dog pivoted on said casing to engage said ratchet plate, a spring embracing said hollow shaft, disposed in said clutch box and adapted for compression by said nut, a Janus-faced clutch-member, one of its faces engageable by said clutch-box, resilient means interposed between said clutch-member and clutch-box, a slotted sleeve provided with radial openings and a clutch-head, said head adapted to engage the other face of said Janus-faced arbor-rotating member, an engine-shaft, a clutch member fixed thereto, an elongated pin in the engine-shaft clutch member, adapted for engagement with the openings in said sleeve, a ring fixed on said sleeve, a clutch-member fixed on the inner end of the motor-shaft and adapted for engagement by the member on the engine-shaft, a locking-annulus fixed on the casing head and adapted to lock the arbor-revolving clutch member from backward movement, and manually actuable means for throwing said members out of locked engagement, said arbor rotatable by said motor-spring when the barrel is rotating and the barrel held from rotation while the arbor is rotating.

12. In combination in an engine-starter, a spring-barrel adapted for rotation, engine-shaft actuated means for imparting rotary motion thereto, a power storing spring, one of its ends fixed to said barrel, and an arbor rotatorily actuated by said spring, said barrel and arbor having alternate rotatory movements in the same direction.

13. In combination in an engine-starter, an engine-shaft, a motor-shaft adapted for engagement therewith, a spring-barrel adapted for rotation, means interposed between said motor-shaft and barrel whereby the former actuates the latter, a power-storing spring adapted to be energized by said barrel, a nut having both rotary and reciprocatory movements, means interposed between said spring and engine-shaft for imparting said movements to said nut, and means interposed between said nut and motor-shaft whereby the nut disengages said motor-shaft from said engine shaft.

14. In combination in an engine-starter, an engine-shaft, a motor-shaft adapted for engagement therewith, a spring barrel adapted for rotation, means interposed between said motor-shaft and barrel whereby the former actuates the latter, means for locking the barrel from backward movement, a power storing spring adapted to be energized by said barrel, a nut having both rotary and reciprocatory movements, means interposed between said spring and engine-shaft for imparting said movements to said nut, means for locking a portion of the last recited means from backward movement, and means interposed between said nut and motor-shaft whereby the nut disengages said motor-shaft from said engine-shaft.

15. Spring-releasing means for motors, said means comprising manually actuable lock-engaging means, stationary locking means, with which said manually actuable means is adapted to be thrown into engagement, means for disengaging them, a rotatory Janus-faced clutch member which in its locked position engages said stationary means, and means for disengaging said Janus-faced member from said locking means.

16. In an engine-starter, a rotatable spring-barrel, a power-storing spring, one of its ends fixed to said barrel, an arbor rotatable by said spring, said arbor including a clutch-box, a clutch member actuable in one longitudinal direction by said box, and engine-actuated means for actuating said clutch-member in the contrary direction.

17. In an engine-starter, in combination, an arbor, power-storage means for imparting rotary motion thereto, a starter-shaft, means for locking said shaft from rotation at predetermined times, a nut rotatable by said arbor and adapted to have reciprocatory movements with relation thereto, a hollow shaft provided with a peripheral thread, on which said nut is mounted, means for imparting rotary movement to said shafts, said shafts and arbor adapted to rotate in the same direction, but alternately, means for locking said shaft from rotation at predetermined times, and an engine-shaft, the starter-shaft actuable in one direction by said nut to disengage said engine-shaft, and motor shaft.

18. In an engine-starter, in combination, an arbor, power-storage means, means for imparting rotary motion thereto, means for locking said arbor from rotation at predetermined times, a nut rotatable by said arbor and adapted to reciprocate longitudinally thereof, a hollow shaft provided with a peripheral thread with which said nut is adapted for engagement, said shaft provided also with a plane portion on which said threads terminate and onto which said nut is adapted to pass, means for imparting rotary movement to said shaft, means for reëngaging said nut with the threads on said shaft, said shaft and arbor adapted to rotate in the same direction, but alternately, means for locking said shaft from rotation at predetermined times, an engine-shaft, and a starter-shaft actuable in one direction by said nut to disengage the last recited shafts.

19. In an engine-starter, spirally threaded means adapted to rotate, means for holding it from rotation, means for rotating it, traveling means adapted to receive endwise movement in one direction from said threaded means, means for rotating said traveling means with relation to said spiral means and thereby imparting longitudinal movement to said traveling means, the direction of rotation of both the traveling means and the spiral-faced means being the same, and means for imparting longitudinal movements to said hollow shaft.

20. In an engine-starter, a spirally threaded rotatory shaft, means for locking it from rotation, means for rotating it, a nut on said shaft, said shaft adapted to impart longitudinal movement in one direction to said nut, means for rotating said nut on said shaft while the shaft is held by said locking means, the direction of rotation of said shaft and nut-rotating means being the same, and means for imparting longitudinal movements to said hollow shaft.

21. In an engine starter, a spirally threaded rotatory shaft, means for locking it from rotation, means for rotating it, a nut on said shaft, said shaft in revolving adapted to impart longitudinal movement in one direction to said nut, and an internally grooved arbor in which said nut has endlong movement, said arbor adapted also to rotate said nut to cause it to traverse said shaft in a direction contrary to that above described, but the direction of movement of rotation of said shaft and arbor being the same.

22. In an engine starter, a shaft having a peripheral thread terminating in a plane end portion, means for rotating it, means for locking it from rotation, a nut on said shaft, said shaft in revolving adapted to impart longitudinal movement in one direction to said nut, means for limiting the movement of the nut in the direction recited, an internally grooved arbor adapted to impart contrary longitudinal movement to said nut until it disengages from said thread and rests on the plane portion of said shaft, and means for causing said nut to reëngage said thread.

23. In a device of the character described, a motor-shaft, a cranking-sleeve normally out of engagement therewith, means for manually throwing said sleeve into engagement with said shaft, an arbor, arbor-actuated means for rotating said shaft, and means for locking said arbor-actuated means.

24. In an engine-starter, a power-storing spring, a stationary lock, an arbor, arbor-actuated rotary means adapted to engage said lock when the engine is running and the spring wound, and engine-cranking means adapted to force said arbor-actuated means out of engagement with said lock, whereby said spring is released to actuate said arbor.

25. In an engine-starter, in combination, a spirally-threaded rotatable shaft, reciprocatory and rotatory means engaged by the threads thereon whereby said shaft is actuated longitudinally, and means for imparting movement to said reciprocatory and rotatory means, the last recited means adapted to travel longitudinally without rotation to one end of its path of longitudinal movement and to rotate indefinitely at the other end thereof.

26. An engine-starter in which are combined a spiral faced shaft having a non-operative peripheral surface at one end portion, means for rotating said shaft, a nut or dog threaded on the spirals of said shaft, means for causing the nut to traverse the spirals, clutch-mechanism adapted for movement by said nut, and clutch-mechanism adapted for movement by said shaft, said nut adapted to pass, in one of its movements, onto said non-operative surface.

27. An engine-starter in which are combined a shaft provided with a thread terminating in a plane surface, a nut threaded on the threaded portion recited and adapted to pass onto said plane surface, means for causing it to reëngage said thread, said nut adapted to impart longitudinal movement in one direction to said shaft and the latter to impart movement in the contrary direction to said nut, means for rotating the shaft in one direction while the nut is held from rotation, and means for rotating the nut in the same direction while the shaft is held from rotation.

28. In combination in an engine starter, a spiral-faced shaft, a nut threaded thereon, means for rotating said shaft while the nut is held from rotation, whereby the nut is caused to travel longitudinally in one direction on said shaft, means for rotating said nut while said shaft is held from rotation, whereby said nut is caused to traverse said shaft in the contrary longitudinal direction, and means for imparting longitudinal movement to said shaft.

29. In combination in an engine starter, a shaft provided with a thread terminating in a plane surface, a nut threaded on the threaded portion recited and adapted to pass onto said plane surface, means for causing it to reëngage said thread, said nut adapted to impart movement in one direction to said shaft and said shaft adapted to impart movement in the contrary direction to said nut, means for rotating the shaft in one direction while the nut is held from rotation, and means for imparting rotatory motion in the same direction to said nut while the shaft is held from rotation.

30. In combination in an engine starter, a threaded, rotatable clutch-actuating shaft, a threaded, rotatable clutch-actuating nut thereon, means for imparting rotary movement to said shaft whereby longitudinal movement in one direction is imparted to said nut, and means for imparting rotary motion to said nut whereby it is caused to traverse said shaft in the opposite direction, said nut adapted to disengage from the threads on said shaft whereby the latter may rotate indefinitely.

31. In combination, a threaded rotatable clutch-actuating shaft, a threaded, rotatable clutch-actuating nut thereon, said shaft in rotating imparting longitudinal movement in one direction to said nut, and means for stopping the longitudinal movement of the nut while the shaft continues to rotate, whereby the continued rotations of the shaft within the nut will cause the shaft to be moved by said nut in a longitudinal direction contrary to that above described of the nut.

32. In an engine-starter, co-acting threaded, rotatory clutch-actuating elements, one threaded on the other and adapted for reciprocatory movements thereon, for rotating and thereby causing one of said elements to traverse the other of said elements longitudinally in one direction, the continued rotations causing disengagement, whereby one may rotate indefinitely without affecting the other.

In witness whereof I hereunto affix my signature at Galesburg, in the county and State above written, this 26th day of December, 1910.

ALFRED WM. KNUTSON.

Witnesses:
MARY ENGLISH,
C. S. RICHARDS.